(12) United States Patent
Kim et al.

(10) Patent No.: US 11,452,423 B2
(45) Date of Patent: Sep. 27, 2022

(54) CLEANING ROBOT AND METHOD OF CONTROLLING THE SAME

(71) Applicant: Samsung Electronics Co., Ltd., Suwon-si (KR)

(72) Inventors: Hwa-Sung Kim, Yongin-si (KR); Chang Hyun Park, Suwon-si (KR); Su-Ho Jo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 16/635,756

(22) PCT Filed: Jun. 18, 2018

(86) PCT No.: PCT/KR2018/006849
§ 371 (c)(1),
(2) Date: Jan. 31, 2020

(87) PCT Pub. No.: WO2019/027140
PCT Pub. Date: Feb. 7, 2019

(65) Prior Publication Data
US 2021/0121032 A1    Apr. 29, 2021

(30) Foreign Application Priority Data
Aug. 2, 2017  (KR) .................. 10-2017-0098102

(51) Int. Cl.
*A47L 9/28* (2006.01)
*A47L 11/40* (2006.01)

(52) U.S. Cl.
CPC ........... *A47L 9/2805* (2013.01); *A47L 9/2852* (2013.01); *A47L 11/4011* (2013.01);
(Continued)

(58) Field of Classification Search
CPC .. A47L 11/40; A47L 11/4011; A47L 11/4061; A47L 11/4066; A47L 2201/04;
(Continued)

(56) References Cited

U.S. PATENT DOCUMENTS 5,935,179 A * 8/1999 Kleiner ................ G05D 1/0255
701/23
8,600,553 B2 * 12/2013 Svendsen ............... G05D 1/028
700/258
(Continued)

FOREIGN PATENT DOCUMENTS

JP    2005-312893 A    11/2005
KR   10-2009-0005616 A    1/2009
(Continued)

OTHER PUBLICATIONS

KR-20130020062-A—English Machine Translation (Year: 2013).*
(Continued)

*Primary Examiner* — Marc Carlson
(74) *Attorney, Agent, or Firm* — Jefferson IP Law, LLP

(57) ABSTRACT

The present disclosure relates to a cleaning robot and a method of controlling the same, and more particularly, to a cleaning robot that changes a moving path by detecting an obstacle through a change in permittivity detected while driving about a cleaning space, and a method of controlling the same. The cleaning robot comprises a main body; a driver configured to move the main body; an obstacle detector including an electrode plate provided on the bottom of the main body and a touch IC configured to detect a change in capacitance detected by the electrode plate and; and a controller configured to determine the obstacle based on a signal transmitted by the obstacle detector, and to control the driver.

14 Claims, 18 Drawing Sheets

(52) U.S. Cl.
CPC ....... *A47L 11/4061* (2013.01); *A47L 11/4066* (2013.01); *A47L 2201/04* (2013.01)

(58) Field of Classification Search
CPC ...... A47L 2201/06; A47L 9/28; A47L 9/2805; A47L 9/2852
See application file for complete search history.

(56) References Cited

U.S. PATENT DOCUMENTS

| | | | | |
|---|---|---|---|---|
| 9,505,140 | B1 * | 11/2016 | Fay | ........................ G01D 5/142 |
| 9,877,630 | B2 * | 1/2018 | Wolfe | ................. A47L 11/4088 |
| 10,035,270 | B2 * | 7/2018 | Fay | ...................... B25J 19/0075 |
| 2016/0296092 | A1 * | 10/2016 | Wolfe | .................. A47L 9/2805 |

FOREIGN PATENT DOCUMENTS

| KR | 10-2011-0053767 A | | 5/2011 |
|---|---|---|---|
| KR | 10-2013-0020062 A | | 2/2013 |
| KR | 20130020062 A | * | 2/2013 |
| KR | 10-1302149 B1 | | 8/2013 |
| KR | 10-1495866 B1 | | 2/2015 |
| KR | 10-2015-0050875 A | | 5/2015 |
| KR | 10-2015-0065972 A | | 6/2015 |
| KR | 10-2016-0004166 A | | 1/2016 |
| KR | 10-2016-0017933 A | | 2/2016 |
| KR | 10-2016-0105825 A | | 9/2016 |

OTHER PUBLICATIONS

Korean Office Action dated May 12, 2020, issued in Korean Application No. 10-2017-0098102.
Korean Office Action dated Jun. 10, 2020, issued in Korean Application No. 10-2017-0098102.
Korean Office Action dated Jan. 18, 2020, issued in Korean Application No. 10-2017-0098102.
Extended European Search Report dated Mar. 10, 2020, issued in European Application No. 18841616.8.

* cited by examiner

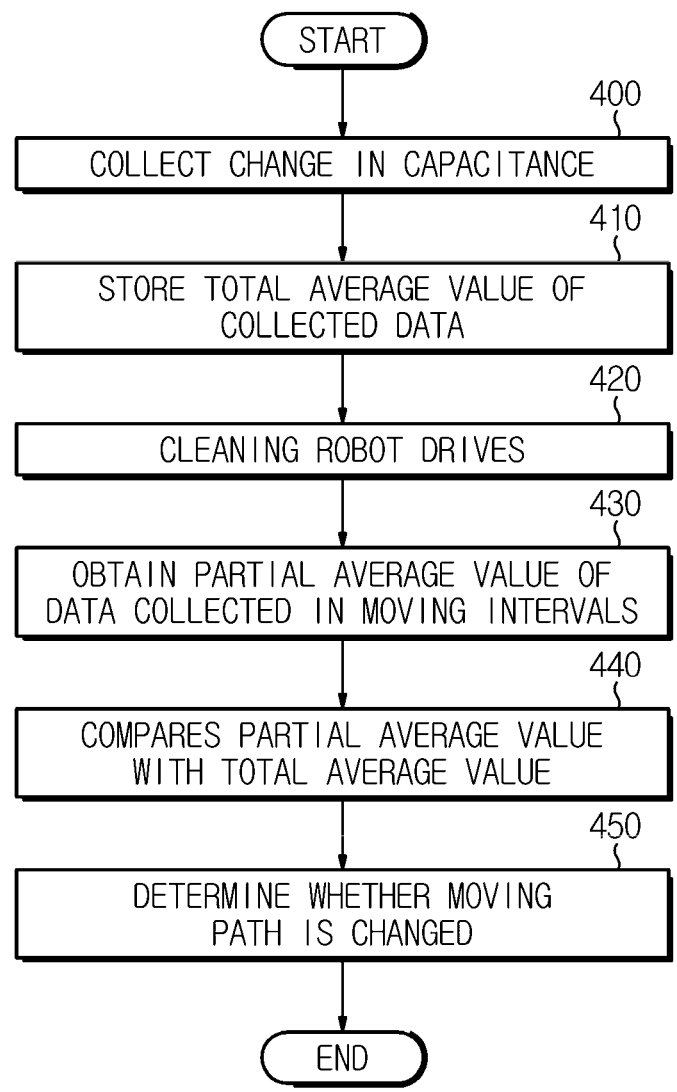

CLEANING ROBOT AND METHOD OF CONTROLLING THE SAME

TECHNICAL FIELD

The present disclosure relates to a cleaning robot and a method of controlling the same, and more particularly, to a cleaning robot that changes a moving path by detecting an obstacle through a change in permittivity detected while driving about a cleaning space, and a method of controlling the same.

BACKGROUND ART

A cleaning robot is an apparatus that automatically cleans a region to be cleaned (hereinafter referred to as "cleaning space") by suctioning impurities, such as dust, etc., from a floor while autonomously driving about the cleaning space without user intervention. That is, the cleaning robot cleans the cleaning space while driving about the cleaning space.

A conventional cleaning robot uses an optical sensor to detect obstacles. However, the optical sensor has a difficulty in detecting whether there is liquid on the floor of a moving path.

When the cleaning robot does not detect the liquid on the floor that is in the moving path, the cleaning robot moves a brush while passing through the liquid. In this case, the brush will become wet and the cleaning will not be done properly. In addition, the cleaning robot may become dirty due to the liquid, and damage to various components of the cleaning robot may occur due to a liquid splashing phenomenon.

Alternatively, the conventional cleaning robot may be provided with electrode leads on wheels to detect moisture. However, this method may detect the presence of liquid only when the wheels are in contact with the liquid, it is not able to accurately avoid a region where the liquid is located, and may cause continuous false detection when the wheels are in contact with the liquid.

DISCLOSURE

Technical Problem

The present disclosure is directed to providing a cleaning robot capable of detecting obstacles such as liquid and drives to avoid the obstacles before driving the cleaning robot, thereby preventing odors caused by liquid substances entering a dust canister and preventing damage to cleaning robot parts by the liquid, and a method of controlling the same.

Further, the present disclosure is directed to providing a cleaning robot that can classify the types of obstacles according to a change in permittivity, thereby variously changing an operation of the cleaning robot for each of the types of obstacles to prevent a malfunction of the cleaning robot according to the obstacles, and a method of controlling the same.

Technical Solution

One aspect of the present disclosure provides a cleaning robot including: a main body; a driver configured to move the main body; an obstacle detector including an electrode plate provided on the bottom of the main body and a touch IC configured to detect a change in capacitance detected by the electrode plate; and a controller configured to determine an obstacle based on a signal transmitted by the obstacle detector, and to control the driver.

The touch IC may be provided on a Printed Circuit Board (PCB) substrate including the electrode plate.

The main body may further include a sub-body provided toward the front of the main body. The obstacle detector may be provided in the sub-body toward a driving direction in which the main body drives by the driver.

The electrode plate may be disposed in at least one pad shape and provided on the bottom of the main body at a predetermined interval.

The electrode plate may be provided spaced apart from a predetermined distance between the main body and the bottom surface.

The touch IC and the electrode plate may be provided toward the side of the driving direction in which the main body drives by the driver in the sub-body.

The cleaning robot may further include a storage configured to store an average value of the capacitance transmitted by the touch IC while the main body is driven by the driver.

When a difference between a measured value of the capacitance detected by the touch IC and the average value exceeds a predetermined reference value while the main body drives, the controller may be configured to control the driver to change a driving direction of the main body.

The controller may be configured to compare a measured value of the capacitance detected by the touch IC with the stored average value while the main body drives to determine the type of the obstacle, and to change an operation of the driver based on the type of the obstacle.

The controller may be configured to determine the type of the obstacle based on whether a difference between the measured value and the average value is within a predetermined range.

The measured value may include a partial average value of the change in the capacitance values collected by the touch IC for a predetermined time.

The storage may be configured to store a cleaning space map based on a space in which the driver moves. The controller may be configured to modify a stored map based on the determined obstacle.

Another aspect of the present disclosure provides a method of controlling a cleaning robot, the cleaning robot including an electrode plate provided on a main body and a touch IC configured to detect a change in capacitance detected by the electrode plate, the method including: storing, by a storage, an average value of the change in the capacitance detected by the touch IC in a cleaning space in which the cleaning robot drives; comparing, by a controller, the stored average value with a measured value detected by the touch IC while the main body is driving; and based on the comparison result, controlling, by the controller, a driving direction of the main body.

The measured value may include a partial average value of the change in the capacitance values collected by the touch IC for a predetermined time.

The comparing may include determining whether a difference between the partial average value and the average value exceeds a predetermined reference value.

Advantageous Effects

According to the above-described cleaning robot and the method of controlling the cleaning robot, by detecting obstacles such as liquid and driving to avoid the obstacles before driving the cleaning robot, it is possible to prevent odors caused by liquid substances entering a dust canister and to prevent damage to cleaning robot parts by the liquid.

Further, according to the above-described cleaning robot and the method of controlling the cleaning robot, since the types of obstacles according to a change in permittivity can be classified, it is possible to prevent a malfunction of the cleaning robot according to the obstacles by variously changing an operation of the cleaning robot for each of the types of the obstacles.

DESCRIPTION OF DRAWINGS

FIG. 10 is a flowchart illustrating a control method of a cleaning robot for avoiding obstacles according to an embodiment of the present disclosure.

MODES OF THE INVENTION

Figure 1:
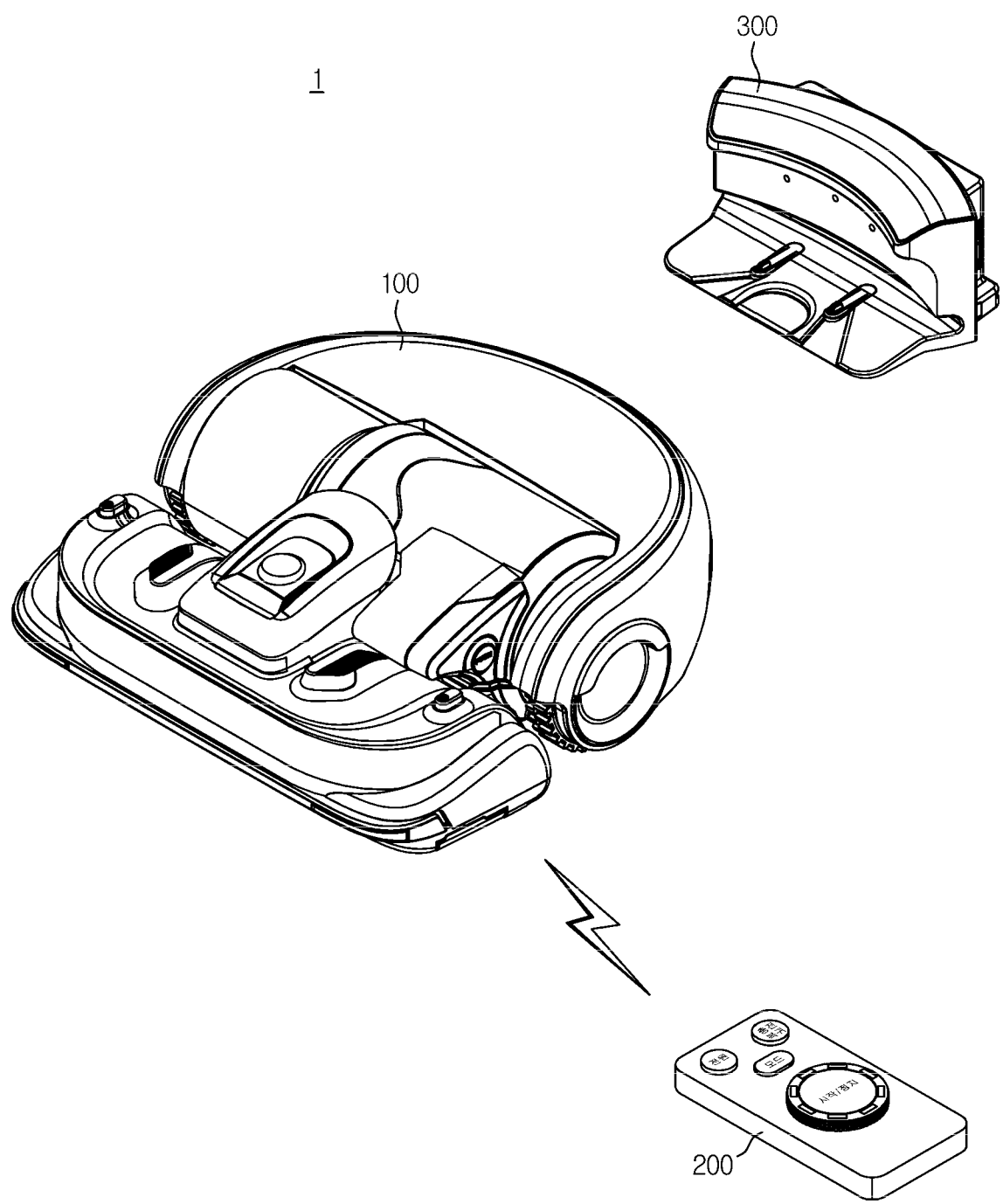
FIG. 1 is a view illustrating an overall configuration of a cleaning robot system according to embodiments of the present disclosure.

Like reference numerals refer to like elements throughout the specification. Not all elements of embodiments of the present disclosure will be described, and description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

Further, when it is stated that a layer is "on" another layer or substrate, the layer may be directly on another layer or substrate or a third layer may be disposed therebetween.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

The principle and exemplary embodiments of the present disclosure will now be described with reference to the accompanying drawings.

FIG. 1 is a view illustrating an overall configuration of a cleaning robot system according to embodiments of the present disclosure.

Referring to FIG. 1, a cleaning robot system 1 may include a cleaning robot 100 for performing a task while autonomously driving across a region, a device 200 separated from the cleaning robot 100 for remotely controlling the cleaning robot 100, and a charging station 300 separated from the cleaning robot 100 for charging battery power of the cleaning robot 100.

The cleaning robot 100 is a device for performing a function corresponding to a control command received from the device 200, and may be equipped with a rechargeable battery and an obstacle detector 140 (see FIG. 3) to avoid obstacles while the cleaning robot 100 is driving around, to detect the obstacles located in a cleaning space.

The cleaning robot 100 may perform a process of localization and map building to generate a map from information about the cleaning space through an image obtainer 150 (see FIG. 3), i.e., perform Visual Simultaneous Localization and Mapping (Visual SLAM). The cleaning robot 100 may perform avoidance driving by combining the generated map and the detected obstacle data.

A detailed description of obstacle detection will be described later with reference to the following drawings.

The cleaning robot 100 may have various forms in addition to what is illustrated in FIG. 1. Hereinafter, the cleaning robot 100 including wheel 163 (see FIG. 2) will be described as an embodiment. However, the cleaning robot 100 may be provided in various configurations in addition to including the wheel, and there is no limitation.

The device 200 is a remote control device for wirelessly transmitting the control command to control movement of the cleaning robot 100 or force the cleaning robot 100 to perform the task, and may include a cell phone or Personal Communication Service (PCS) phone, a smartphone, a Personal Digital Assistant (PDA), a Portable Multimedia Player (PMP), a laptop computer, a digital broadcasting terminal, a netbook, a tablet, a navigation device, etc.

In addition, the device 200 may include a device that is able to implement various functions using various application programs, such as a digital camera, camcorder, etc., equipped with a wired/wireless communication function.

The device 200 may also be a simple form of a common remote controller. The remote controller typically exchanges signals with the cleaning robot 100 using Infrared Data Association (IrDA).

The device 200 may exchange wireless communication signals with the cleaning robot 100 using various communication schemes, such as Radio Frequency (RF), Wireless Fidelity (Wi-Fi), Bluetooth, Zigbee, near field communication (NFC), Ultra Wide Band (UWB) communication, etc., without being limited thereto. The device 200 may use any communication scheme that may exchange wireless communication signals with the cleaning robot 100.

The device 200 may communicate with communication circuitry 190 (see FIG. 3) provided in the cleaning robot 100, and may remotely control the cleaning robot 100.

Particularly, the device 200 may include a power button to control power on/off of the cleaning robot 100, a return-to-charge button to instruct the cleaning robot 100 to return to the charging station 300 for charging the battery of the cleaning robot 100, a mode button to change a control mode of the cleaning robot 100, a start/stop button to start/stop operation of the cleaning robot 100 or initiate, cancel, or confirm a control command, a dial, etc.

The device 200 may transmit a signal transmitted from the prepared button to the communication circuitry 190 of the cleaning robot 100.

The charging station 300 is for charging the battery of the cleaning robot 100, and may be equipped with a guide member (not shown) to guide the cleaning robot 100 to dock with the charging station 300. The guide member may be equipped with a connection terminal (not shown) to charge a power supply 130 of the cleaning robot 100.

Figure 2:
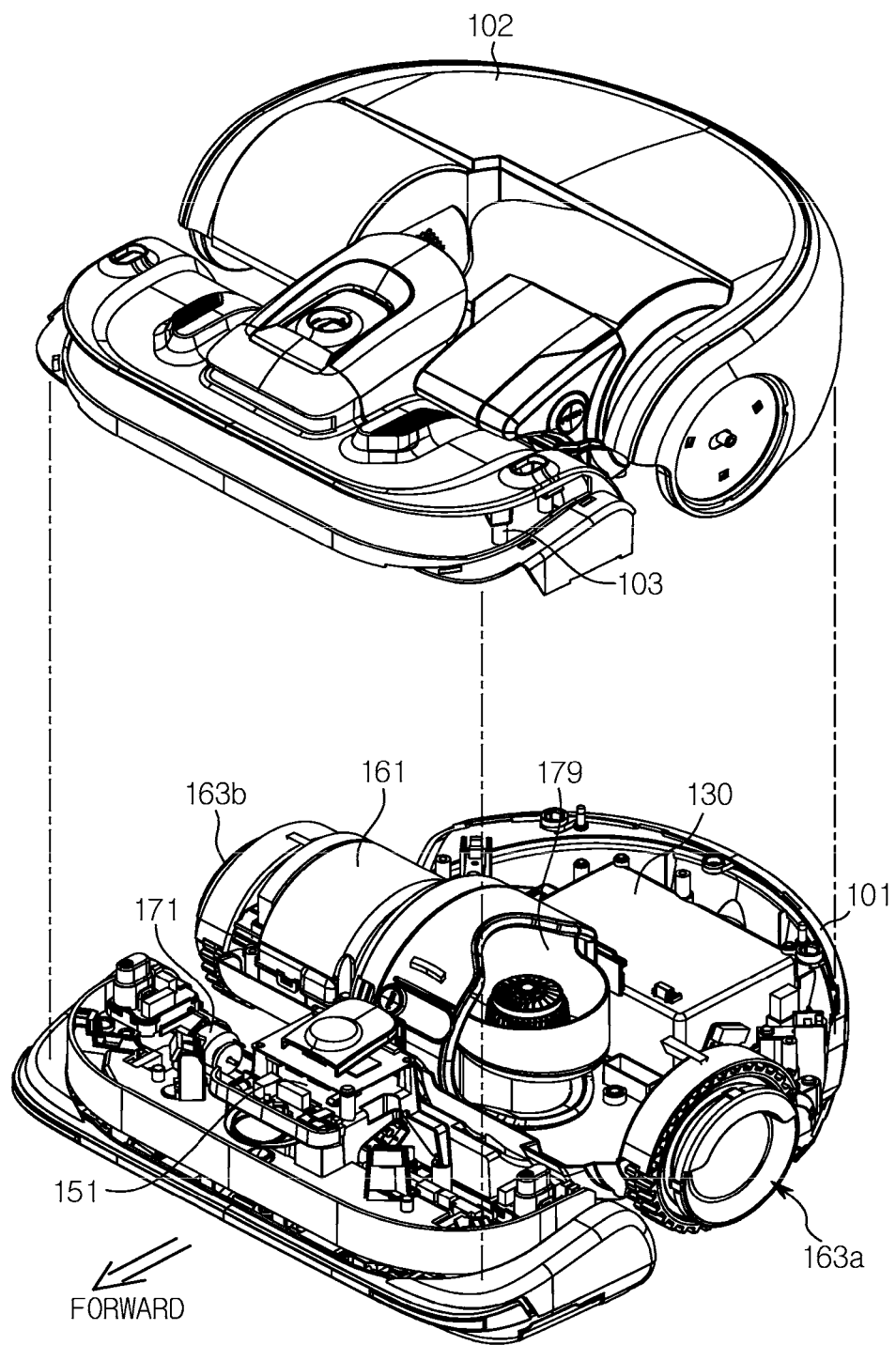
FIG. 2 is a view schematically illustrating an exterior of a cleaning robot according to embodiments of the present disclosure.

FIG. 2 is a view schematically illustrating an exterior of a cleaning robot according to embodiments of the present disclosure.

Referring to FIG. 2, the cleaning robot 100 is configured to include various configurations, such as a main body 101 for forming the exterior, a cover 102 for covering the top of the main body 101, a driver 160 for driving the main body 101, the power supply 130 for supplying power for driving the driver 160 and other components provided in the main body 101, and a cleaner 170 for performing essential functions of the cleaning robot 100.

The cover 102 forming the exterior of the cleaning robot 100 may protect various configurations provided in the main body 101. In addition, although not particularly illustrated in FIG. 2, the cover 102 may include an input button group 121 and a display 123 required for the operation of a user interface (UI) 120 (see FIG. 3) to communicate with a user.

The main body 101 may support the various components and configurations installed therein.

Particularly, the power supply 130 may include the battery electrically connected to respective loads to drive the driver 160 and the main body 101 for supplying power thereto. The battery is a rechargeable secondary battery, and is charged by receiving power from the charging station 300 while the main body 101 is connectable with the charging station 300, for example, after completing the task. When the remaining power runs short, the power supply 130 is charged by receiving a charging current from the charging station 300.

The power supply 130 may transmit power to a wheel driving motor 161 to move the main body 101. In addition, the power supply 130 may transmit power to various configurations provided in the main body 101.

The wheel driving motor 161 may provide a driving force for driving the wheel 163 for enabling the main body 101 to move forward, move backward, or rotate while performing the task.

The main body 101 may be provided with the wheel 163 whose angle of rotating changes according to the state of a floor surface on which the cleaning robot 100 moves.

Particularly, the wheel 163 may be provided at both side surfaces of the main body 101, with a left wheel 163a (see FIG. 7) provided at the left side and a right wheel 163b (see FIG. 7) provided at the right side with respect to the front of the cleaning robot 100.

The wheel 163 may enable the cleaning robot 100 to move forward, move backward, or rotate by moving forward, moving backward, or rotating according to a command of a controller 110 (see FIG. 3) as will be described below.

For example, the cleaning robot 100 may move forward or move backward by rotating the wheel 163 to a forward or backward direction. Particularly, the cleaning robot 100 may rotate to the left by rotating the right wheel 163b to the forward direction while rotating the left wheel 163a to the backward direction, and may rotate to the right by rotating the left wheel 163a to the forward direction while rotating the right wheel 163b to the backward direction.

In addition, the main body 101 may include a brush driving motor 171 for driving a drum brush 173 (see FIG. 7) of the cleaner 170, and may include a dust box 179 for storing dust sucked by the drum brush 173.

In addition to the above-described configuration, the cleaning robot 100 may include various configurations not particularly described in FIG. 2, such as an upward camera module 151 for capturing a ceiling of the cleaning space.

Figure 3:
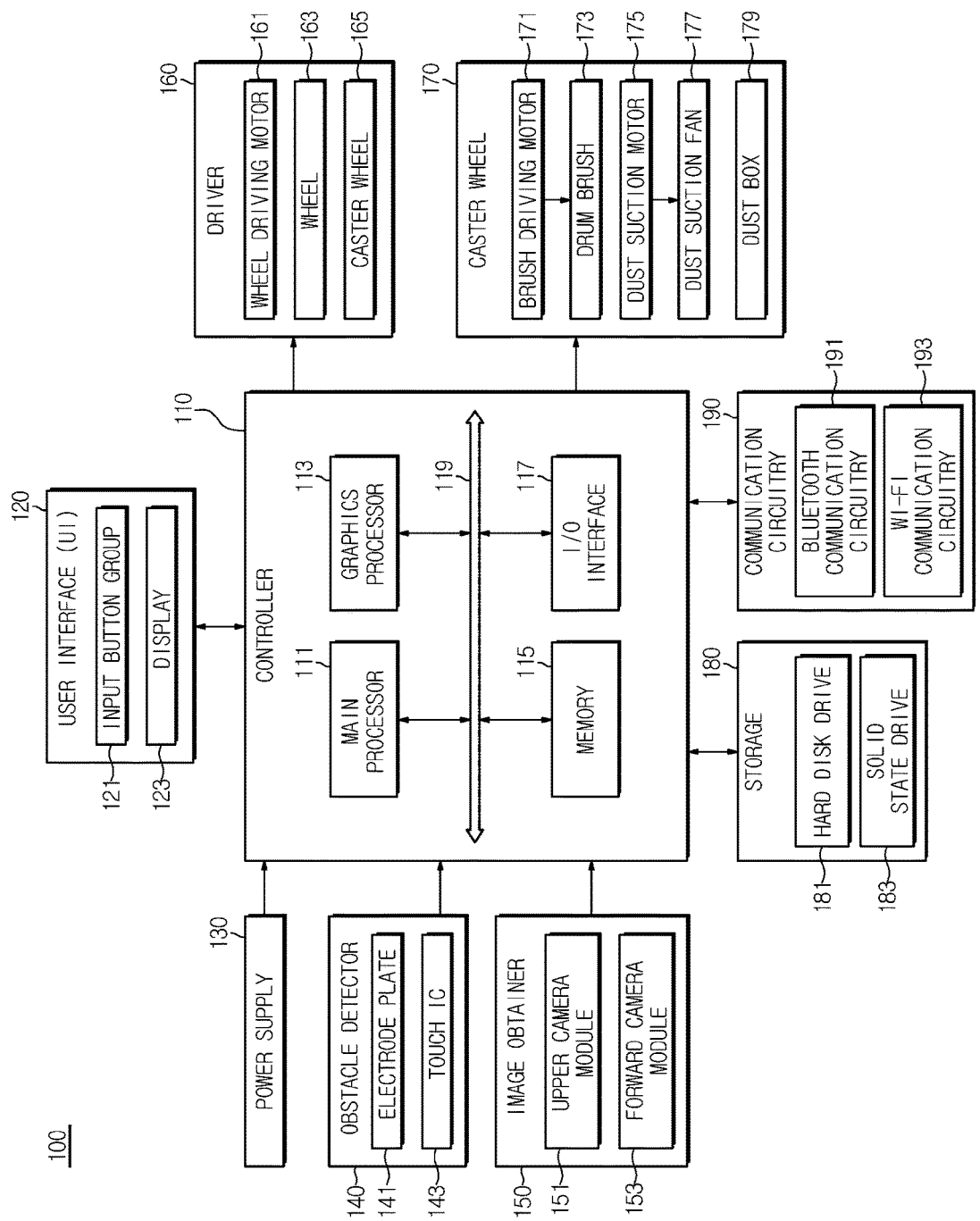
FIG. 3 is a control block diagram of a cleaning robot according to embodiments of the present disclosure.

FIG. 3 is a control block diagram of a cleaning robot according to embodiments of the present disclosure.

Referring to FIG. 3, the interior and exterior parts of the cleaning robot 100 may include the UI 120 configured for user interaction, the power supply 130 for supplying power to the components in which the cleaning robot 100 operates, the obstacle detector 140 for detecting an obstacle disposed in a cleaning space, the image obtainer 150 for obtaining a surrounding image of the cleaning robot 100, the driver 160 for moving the cleaning robot 100, the cleaner 170 for cleaning the cleaning space, a storage 180 for storing programs and data related to the operation of the cleaning robot 100, the communication circuitry 190 for communicating with the device 200 or an external device, and the controller 110 for controlling the operation of the cleaning robot 100.

The UI 120 may be disposed at the top surface of the main body 101 of the cleaning robot 100 as illustrated in FIG. 2, and may include a plurality of the input buttons 121 for receiving control commands from the user and the display 123 for displaying information about the operation of the cleaning robot 100.

The plurality of input buttons 121 may include a power button 121a to turn the cleaning robot 100 on or off, an operation button 121b to operate or stop the cleaning robot 100, and a return button 121c to allow the cleaning robot 100 to return to the charging station 300.

Each of the buttons contained in the plurality of input buttons 121 may be implemented as a push switch or a membrane switch to detect user pressurization, or may be implemented as a touch switch to detect contact of some parts of the user's body.

The display 123 may display information of the cleaning robot 100 in response to the control command entered by the user. For example, the display 123 may display the operation state of the cleaning robot 100, the power state, a user-selected cleaning mode, information indicating whether to return to the charging station 300, etc.

The display 123 may be implemented as a light emitting diode (LED), an organic light emitting diode (OLED), a liquid crystal display (LCD), or the like.

In addition, the display 123 may also be implemented as a touch screen panel (TSP) configured to receive the control command from the user as well as to display the operation information corresponding to the received control command.

The TSP may include a display for displaying operation information and user-input control commands, a touch panel for detecting coordinates contacting some parts of the user's body, and a touchscreen controller for determining the user-input control commands on the basis of the contact coordinates detected by the TSP.

The touchscreen controller may compare user-touched coordinates detected through the touch panel with the control command coordinates displayed through the display such that it can recognize the user-input control command.

The power supply 130 may supply power so that each of the components of the cleaning robot 100 can operate while the cleaning robot 100 drives about the cleaning space.

As described above, the power supply 130 may be provided as the battery in the main body 101 to enable the power supply even after the cleaning robot 100 is separated from the charging station 300. In addition, the power supply 130 may transmit the remaining power amount to the controller 110.

The obstacle detector 140 may detect the obstacle obstructing movement of the cleaning robot 100.

In this case, the obstacle may be any kind of object that can protrude from the floor of the cleaning space and obstruct the movement of the cleaning robot 100 or can be recessed from the floor of the cleaning space and obstruct the movement of the cleaning robot 100. In addition, the obstacle may include liquid such as urine of a dog that flows on the floor, or may also include any objects that can cause a driving problem when the cleaning robot 100 sucks dust from the dust box 179 through the drum brush 173 or the like, such as an earphone or a smailphone charging cable. Further, the obstacle may include furniture (such as a table, sofa, etc.), at least one wall for dividing the cleaning space into a plurality of sections, front door lower in height than the floor of the cleaning space, and the like. The obstacle may include a region in which the cleaning robot 100 may fall when the avoidance driving is not performed in the case of the front door lower in height.

The obstacle detector 140 may detect the obstacle by detecting a change in permittivity and further determine the type of the obstacle.

In particular, the obstacle detector 140 may include an electrode plate 141 and a touch integrated circuit (IC) 143. The electrode plate 141 may be a general all-electric conductor made of copper Cu, and may accumulate electric charges along with the obstacles on the floor depending on a potential applied by the touch IC 143.

The touch IC 143 may detect a change in capacitance according to the obstacle by the electrode plate 141. The touch IC 143 may also detect a small change in the capacitance reaching a sensitivity of 90K, and may be mainly used in an IC chip that recognizes the user's touch in the smailphone or the like.

The touch IC 143 may transmit the detected change in the capacitance to the controller 110, and the controller 110 may determine the obstacle based on the detection value transmitted by the touch IC 143.

On the other hand, the obstacle detector 140 may also include a sensor module for detecting the obstacle by collecting light reflected after irradiating light toward the front or side of the cleaning robot 100 in addition to the components of detecting the obstacle through the change in the capacitance.

The image obtainer 150 may include the upward camera module 151 to obtain an upper image (i.e., ceiling image) of the cleaning robot 100 and a forward camera module 153 to obtain an image of a moving direction of the cleaning robot 100.

The upward camera module 151 may include an image sensor (not shown) provided at the top surface of the cleaning robot 100 to obtain an upward image of the cleaning robot 100 (i.e., the ceiling image of the cleaning space).

The forward camera module 153 may include an image sensor (not shown) provided at the front surface of the cleaning robot 100 to obtain an image of the moving direction of the cleaning robot 100.

In addition, the image sensor contained in the upward camera module 151 or the forward camera module 153 may include a CMOS sensor or a CCD sensor.

The image obtainer 150 may output images obtained by the upward camera module 151 and the forward camera module 153 to the controller 110.

The controller 110 may generate a map of the cleaning space based on the obtained image. The cleaning robot 100 may determine a position of the cleaning robot 100 based on the generated map. More particularly, the controller 110 may extract characteristic points from the images obtained by the upward camera module 151 and the forward camera module 153, and may determine a moving distance, the moving direction, a moving speed, etc. of the cleaning robot 100 on the basis of variation in position of the extracted characteristic points. In addition, the controller 110 may determine the position of the cleaning robot 100 on the basis of the moving distance, the moving direction, the moving speed, etc. of the cleaning robot 100.

The driver 160 may move the cleaning robot 100, and may include the wheel driving motor 161, the wheel 163, and a caster wheel 165 as shown in FIGS. 1 and 2.

The wheel driving motor 161 may generate a rotational force needed to rotate the wheel 163 and move the cleaning robot 100 under the control of the controller 110. In addition, the wheel driving motor 161 may include a plurality of motors to independently drive the left wheel 163*a* and the right wheel 163*b*.

For example, when the wheel driving motor 161 is provided as a left driving motor 161*a* and a right driving motor 161*b*, the left wheel 163*a* and the right wheel 163*b* may rotate independently by the left driving motor 161*a* and the right driving motor 161*b*.

In addition, since the left wheel 163*a* and the right wheel 163*b* can rotate independently, the cleaning robot 100 may move or drive in various ways (e.g., forward movement, backward movement, rotation, and rotate in place).

For example, when the right wheel 163*b* and the left wheel 163*a* rotate in a first direction, the cleaning robot 100 performs straight driving in the forward direction. When the right wheel 163*b* and the left wheel 163*a* rotate in a second direction, the main body 101 may perform straight driving in the backward direction.

In addition, the right wheel 163*b* and the left wheel 163*a* may rotate in the same direction. When the right wheel 163*b* and the left wheel 163*a* rotate at different speeds, the cleaning robot 100 rotates in the right or left direction. When the right wheel 163*b* and the left wheel 163*a* rotate in different directions, the cleaning robot 100 may rotate clockwise or counterclockwise in place.

Through the above-described operation, the controller 110 may perform an avoidance operation of the cleaning robot 100 after the obstacle is detected.

The caster wheel 165 is installed at the bottom of the main body 101, so that a rotation axis of the caster wheel 165 may rotate in response to the movement direction of the cleaning robot 100. The caster wheel 165 having the rotation axis that rotates in response to the movement direction of the cleaning robot 100 does not disturb the driving of the cleaning robot 100, and the cleaning robot 100 can drive while maintaining a stable posture.

The driver 160 may include a motor drive circuit (not shown) for providing a drive current to the wheel driving motor 161 in response to a control signal of the controller 110, a power transmission module (not shown) for providing the rotational force of the wheel driving motor 161 to the wheel 163, and a rotation sensor (not shown) for detecting a rotational displacement and a rotational speed of the wheel driving motor 161 or the wheel 163.

The cleaner 170 may include the drum brush 173 to scatter dirt or dust from the floor to be cleaned, the brush driving motor 171 to rotate the drum brush 173, a dust suction fan 177 to suck in the scattered dust, a dust suction motor 175 to rotate the dust suction fan 177, and the dust box 179 to store the sucked dust.

Figure 4:
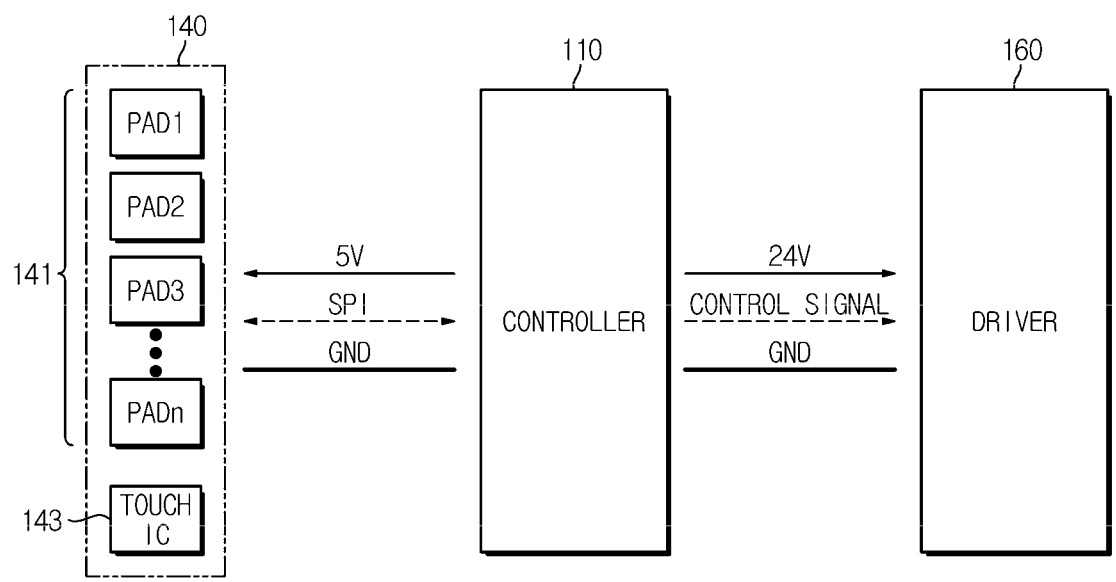
FIG. 4 is a control block diagram for describing a process in which a cleaning robot transmits and receives a control signal for detecting an obstacle and performing an avoidance operation according to an embodiment of the present disclosure.

As illustrated in FIG. 4, the drum brush 173 may be provided at a dust inlet 105 formed at the bottom of a sub-body 103, and may rotate about the rotation axis provided in a direction parallel to the floor to be cleaned, so that the dust from the floor to be cleaned is scattered into the dust inlet 105.

The brush driving motor 171 may be provided adjacent to the drum brush 173, so that it rotates the drum brush 173 in response to the cleaning control signal of the controller 110.

The cleaner 170 may further include a motor drive circuit (not shown) to provide the drive current to the brush driving motor 171 in response to the control signal of the controller 110, and the power transmission module (not shown) to transfer the rotational force of the brush driving motor 171 to the drum brush 173.

As illustrated in FIG. 2, the dust suction fan 177 may be mounted to the main body 101 so that the dust scattered by the drum brush 173 is sucked into the dust box 179.

The dust suction motor 175 may be provided adjacent to the dust suction fan 177, and may rotate the dust suction fan 177 in response to the control signal of the controller 110.

The cleaner 170 may further include the motor drive circuit (not shown) to provide the drive current to the dust suction motor 175 in response to the control signal of the controller 110, and the power transmission module (not shown) to transfer the rotational force of the dust suction motor 175 to the dust suction fan 177.

As illustrated in FIG. 2 the dust box 179 is provided at the main body 101, and may store the dust sucked by the dust suction fan 177.

In addition, the cleaner 170 may further include a dust guide pipe through which dust sucked through the dust inlet 105 is directed to the dust box 179 provided at the main body 101.

The storage 180 may store control programs and control data needed to control the cleaning robot 100, and may further store various application programs and application data needed to perform various functions in response to a user input.

For example, the storage 180 may store an operating system (OS) program to manage structures and resources (software and hardware) contained in the cleaning robot 100, an image processing program to process a reflected light image obtained by the obstacle detector 140, and a motor control program, etc. to control the wheel driving motors 161 and 171 respectively contained in the driver 160 and the cleaner 170.

The storage 180 may act as an auxiliary memory device of a memory 115 to be described later.

Particularly, the storage 180 may include a non-volatile memory, stored data of which is not erased even when the cleaning robot 100 is powered off. For example, the storage 180 may include a hard disk drive 181, a solid state drive 183, and the like.

For example, the storage 80 may store map data indicating the cleaning space map generated prior to initial driving of the cleaning robot 100 in the above-described non-volatile memory. The cleaning space map may include a topological map including connectivity between a plurality of cleaning regions contained in the cleaning space, and a metric map, a grid map, or a geometry map indicating the shape of the cleaning space and the positions of the obstacles. For convenience of description, the metric map, the grid map, and the geometry map will hereinafter be referred to only as "grid map."

The grid map may perform spatial decomposition of the cleaning space so as to represent the cleaning space, and may also represent an arbitrary structure and object (obstacle).

In addition, the topological map may represent connectivity between the plurality of cleaning regions, or the plurality of objects (obstacles), and may abstract the cleaning space using the plurality of cleaning regions and connection lines for interconnecting the cleaning regions.

The grid map and the topological map are formed before the cleaning robot 100 initially drives in the cleaning space, and are stored in the storage 180. In addition, the cleaning robot 100 may update the topological map and the grid map stored in the storage 180 while driving about the cleaning space.

The storage 180 may recognize the obstacle along with the cleaning space map and store the change in the capacitance accordingly. For example, when the obstacle is recognized as a fixed object such as the table or carpet for a certain time, the storage 180 may store an average value of the associated capacitance by mapping with the map.

Thereafter, the cleaning robot 100 may detect the change in the capacitance for the liquid such as a temporary obstacle, for example, a dog's urine, while driving. The storage 180 may transmit the previously stored average value to the controller 110, and the controller 110 may determine whether there is the obstacle by comparing the result value detected by the obstacle detector 140 with the average value. A detailed description thereof will be described later with reference to FIG. 4.

The communication circuitry 190 may communicate with an access point (AP) for relaying wireless communication, user equipment (UE) for mobile communication, and external devices such as other household appliances.

The communication circuitry 190 may include various communication circuitries 191 and 193 and an antenna (not shown) according to a communication protocol. For example, the communication circuitry 190 may include the Bluetooth (Bluetooth™) communication circuitry 191, the Wi-Fi (Wi-Fi™) communication circuitry 193, and the like. The Bluetooth communication circuitry 191 has been widely used to perform data communication between a plurality of end nodes. The Wi-Fi communication circuitry 193 is used to form a local area network (LAN) or to access a wide area network (WAN) such as the Internet.

The cleaning robot 100 may receive map data from the external device through the communication circuitry 190, or may transmit map data to the external device through the communication circuitry 190.

The controller 110 may control individual constituent elements contained in the cleaning robot 100.

The controller 110 may include an input/output (I/O) interface to mediate data communication between the controller 110 and various constituent devices contained in the cleaning robot 100, the memory 115 to store programs and data, a graphics processor 113 to perform image processing, and a main processor 111 to perform calculation operations according to the programs and data stored in the memory 115. In addition, the controller 110 may include a data bus 119 to mediate the data communication among an I/O interface 117, the memory 115, the graphics processor 113, and the main processor 111.

The I/O interface 117 may receive a user command from the UI 120, and may receive an obstacle or the like detected by the obstacle detector 140. Thereafter, the I/O interface 117 may transmit the received user command, the received movement information, and the received obstacle information to the main processor 111, the graphics processor 113, the memory 115, etc. through the data bus 119.

In addition, the I/O interface 117 may transmit various control signals generated from the main processor 111 to the UI 120, the driver 160, or the cleaner 170.

The memory 115 may temporarily store the control program and control data needed to control the cleaning robot 100, the user command received by the UI 120, the movement information detected by a movement detector, the obstacle position information detected by the obstacle detector 140, and various control signals generated from the main processor 111.

The memory 115 may include volatile memories such as SRAM, DRAM, and the like. However, the scope or spirit of the disclosure is not limited thereto. If necessary, the memory 115 may include non-volatile memories, for example, a flash memory, Read Only Memory (ROM), Erasable Programmable Read Only Memory (EPROM), Electrically Erasable Programmable Read Only Memory (EEPROM), etc.

More particularly, the non-volatile memory may semipermanently store the control program and control data needed to control the cleaning robot 100. The volatile memory may retrieve the control program and control data from the non-volatile memory and may store the retrieved control program and control data. Alternatively, the volatile memory may store the user command received by the UI 120, the obstacle position information detected by the obstacle detector 140, and various control signals generated from the main processor 111.

The graphics processor 113 may convert a reflected light image obtained from the obstacle detector 140 into an image having a resolution capable of being processed by the main processor 111, or may convert the reflected light image into a format capable of being processed by the main processor 111.

The main processor 111 may process the data stored in the memory 115 according to the control program stored in the memory 115.

For example, the main processor 111 may process the output signals of the obstacle detector 140 and the image obtainer 150, and may control the power supply 130 to generate a control signal for controlling the driver 160 and the cleaner 170.

The main processor 111 may determine whether there is the obstacle based on the detection result transmitted by the touch IC 143.

Particularly, the main processor 111 may compare the average value of the change in the capacitance previously collected in the cleaning space with a measured value (partial average value) of the change in the capacitance detected while driving. The main processor 111 may determine the obstacle based on whether the comparison result exceeds a predetermined reference. In addition, the main processor 111 may also determine the type of the obstacle based on the magnitude of a compared difference value.

When the main processor 111 determines that there is the obstacle in the driving path of the cleaning robot 100, the main processor 111 may transmit a signal to each of the components to perform various control operations such as avoidance driving or brush reverse rotation. In addition, the main processor 111 may insert the obstacle into the cleaning space map based on the type of the obstacle.

On the other hand, each of the components included in the cleaning robot 100 is not limited to the UI 120, the power supply 130, the obstacle detector 140, the image obtainer 150, the driver 160, the cleaner 170, the storage 180, the communication circuitry 190, and the controller 110. Each of the components included in the cleaning robot 100 may be referred to by a different name to perform the same function.

Although each of the components included in the cleaning robot 100 has exemplarily disclosed the UI 120, the power supply 130, the obstacle detector 140, the image obtainer 150, the driver 160, the cleaner 170, the storage 180, the communication circuitry 190, and the controller 110 for convenience of description, the scope or spirit of the cleaning robot 100 is not limited thereto, and some constituent elements may be excluded from or added to the cleaning robot 100 as necessary. For example, the cleaning robot 100 may include various sensors for measuring acceleration, the moving speed, a moving displacement, and the moving direction in order to detect the movement of the cleaning robot 100 while driving about the cleaning space.

Hereinafter, the operation of the cleaning robot 100 according to the above-described embodiment will be described in detail with reference to the accompanying drawings.

FIG. 4 is a control block diagram for describing a process in which a cleaning robot transmits and receives a control signal for detecting an obstacle and performing an avoidance operation according to an embodiment of the present disclosure.

Referring to FIG. 4, the obstacle detector 140, the controller 110, and the driver 160 included in the cleaning robot 100 may transmit a signal for the avoidance operation.

Particularly, in the obstacle detector 140, the electrode plate 141 may cause an electrostatic change based on the permittivity of the obstacle.

The capacitance may generate the electrostatic charge when the electrode plate 141 accumulates electric charges when the potential is applied. The potential is given while the power supply 130 applies a voltage according to the control signal of the controller 110. According to the example illustrated in FIG. 4, the controller 110 may apply a voltage of 5V to the obstacle detector 140, and the electrode plate 141 may accumulate the electric charges therethrough.

The touch IC 143 may detect the electrostatic change caused by the electrode plate 141. The touch IC 143 may transmit the detected change in the capacitance to the controller 110. In addition, the controller 110 may also transmit the control signal to the touch IC 143 to detect the change in the capacitance as needed.

The controller 110 and the touch IC 143 may transmit and receive signals to a serial peripheral interface (SPI) bus.

Based on the detection result of the touch IC 143, the controller 110 may determine whether the obstacle exists and the type of the obstacle. Based on the determination result, the controller 110 may transmit the control signal to the driver 160 to perform the avoidance operation.

The driver 160 may rotate or pause the wheel driving motor 161 based on the control signal. Accordingly, the cleaning robot 100 may temporarily stop the driving operation. Thereafter, the driver 160 may avoid the obstacle by changing the driving path of the cleaning robot 100 by varying the rotation speeds of the wheels 163.

In FIG. 4, 24V may denote the driving voltage transmitted from the power supply 130 to the controller 110 to drive the driver 160. However, the present disclosure is not limited thereto and may vary depending on the size and specifications of the cleaning robot 100.

Meanwhile, the obstacle detector 140 may vary without necessarily providing a plurality of the electrode plates 141 in a pad shape. In addition, the touch IC 143 may not necessarily be provided in a singular number, and may be variously modified. A detailed description thereof will be described later with reference to FIGS. 5 and 6.

Figure 5:
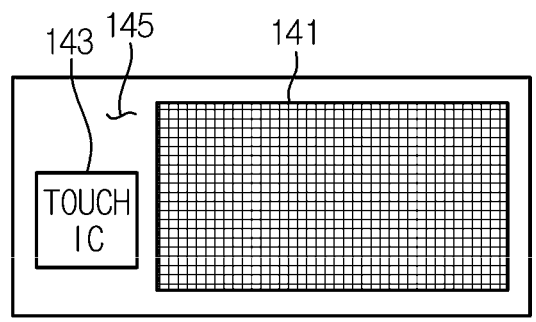
FIGS. 5 and 6 are views for describing an obstacle detector according to an embodiment of the present disclosure.
Figure 6:
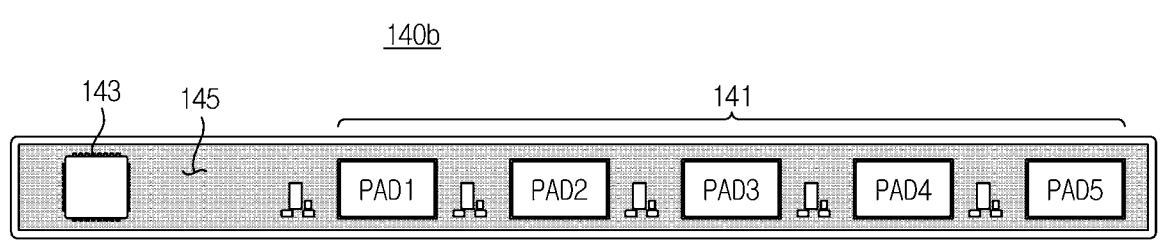

FIGS. 5 and 6 are views for describing an obstacle detector according to an embodiment of the present disclosure.

In the obstacle detector 140a, the touch IC 143 that detects the change in the capacitance that is changed by the electrode plate 141 and the obstacle may be provided on a printed circuit board (PCB) substrate 145.

The touch IC 143 may detect the change in the capacitance that varies between the electrode plate 141 and the spaced obstacle and transmit the signal to the PCB substrate 145 to transmit the detection result to the controller 110.

The PCB substrate 145 may have a predetermined size and may be formed as a module including the electrode plate 141 and the touch IC 143. Particularly, the PCB substrate 145 may be made of FR-4 and manufactured to a width having a predetermined standard. When the obstacle detector 140 is modularized as illustrated in FIG. 5, a plurality of the modules may be attached to the cleaning robot 100.

Referring to FIG. 6, the electrode plate 141 according to another embodiment may be provided in a plurality of the pad shapes.

In the pad shape, each of the electrode plates 141 may be provided in a rectangle of 10 mm×20 mm, and may be spaced apart from each other and attached to the PCB substrate 145. However, the above-described numerical values are merely examples and may be variously changed.

The touch IC 143 may detect each of the capacitances changing in the plurality of electrode plates 141. For example, the touch IC 143 may be set to detect the change in the capacitance with the sensitivity of 90K when the electrode plate 141 is spaced 5 mm from the floor. However, the present disclosure is not limited thereto and may be variously changed.

As illustrated in FIG. 6, the touch IC 143 may detect the change in the capacitance according to the order of each of the electrode plates 141, so that the position of the obstacle may be particularly determined.

Figure 7:
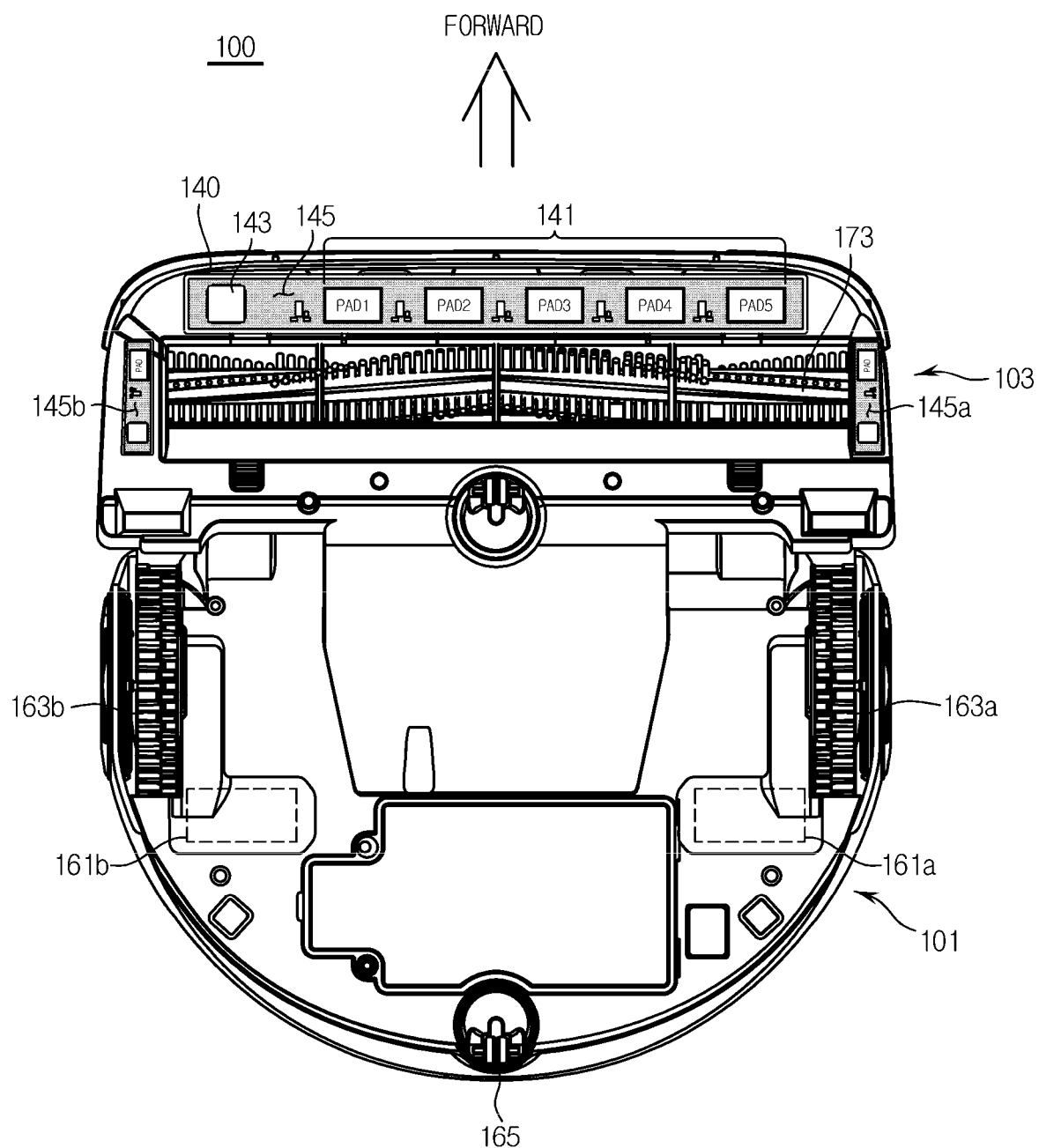
FIG. 7 is a view for describing an example in which an obstacle detector is provided in a cleaning robot.

FIG. 7 is a view for describing an example in which an obstacle detector is provided in a cleaning robot.

FIG. 7 illustrates the bottom surface of the cleaning robot 100 according to an embodiment. The obstacle detector 140 according to an exemplary embodiment may be provided at an outer side of the sub-body 103 provided forward from the main body 101 of the cleaning robot 100.

Accordingly, the obstacle detector 140 may detect the obstacle before the drum brush 173, the driving wheels 163a and 163b, and the caster wheel 165 pass through the obstacle.

The sub-body 103 of the cleaning robot 100 may include the obstacle detector 140 including the electrode plate 141 provided in the plurality of pad forms on the PCB substrate 145 and the touch IC 143 for detecting the change in the capacitance.

On the other hand, as illustrated in FIG. 7, the obstacle detector 140 may be provided in plurality in the side in addition to the front of the sub-body 103. That is, the obstacle detector 140 may be provided on PCB boards 145a and 145b provided on both sides of the PCB substrate 145 and the drum brush 173 formed long in front of the cleaning robot 100.

The obstacle detector 140 illustrated in FIG. 7 is only an example of the cleaning robot 100, and may have various modifications.

Figure 8:
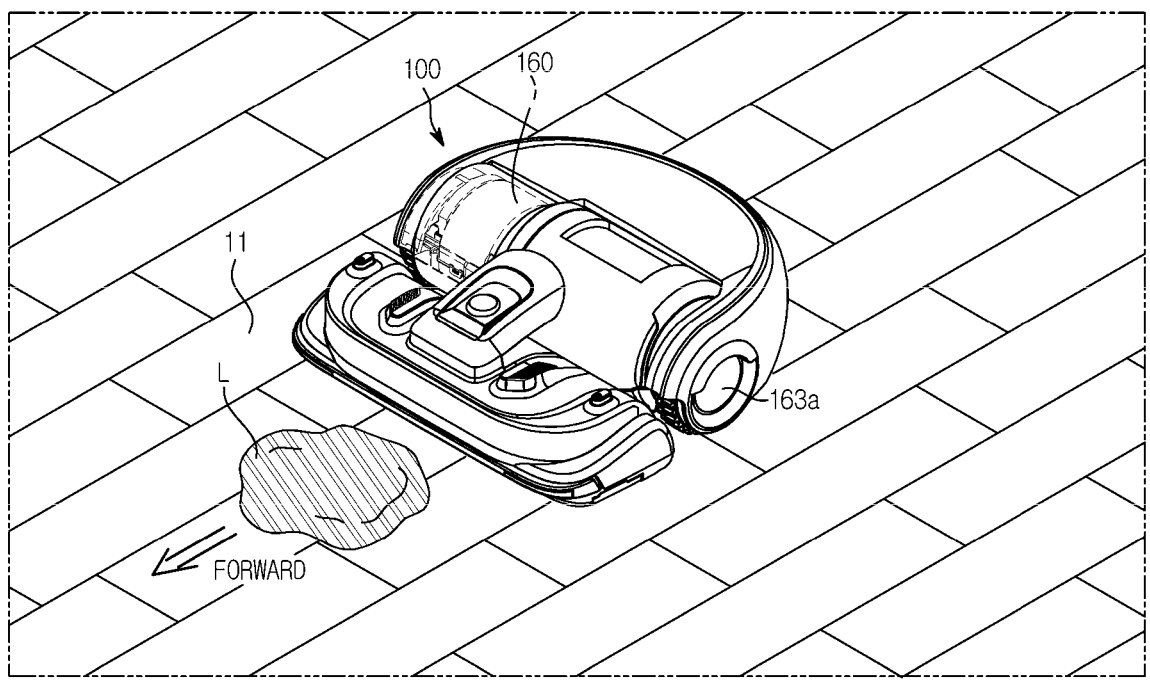
FIGS. 8 and 9 are views for describing a method of detecting liquid by an obstacle detector according to an embodiment of the present disclosure.
Figure 9:
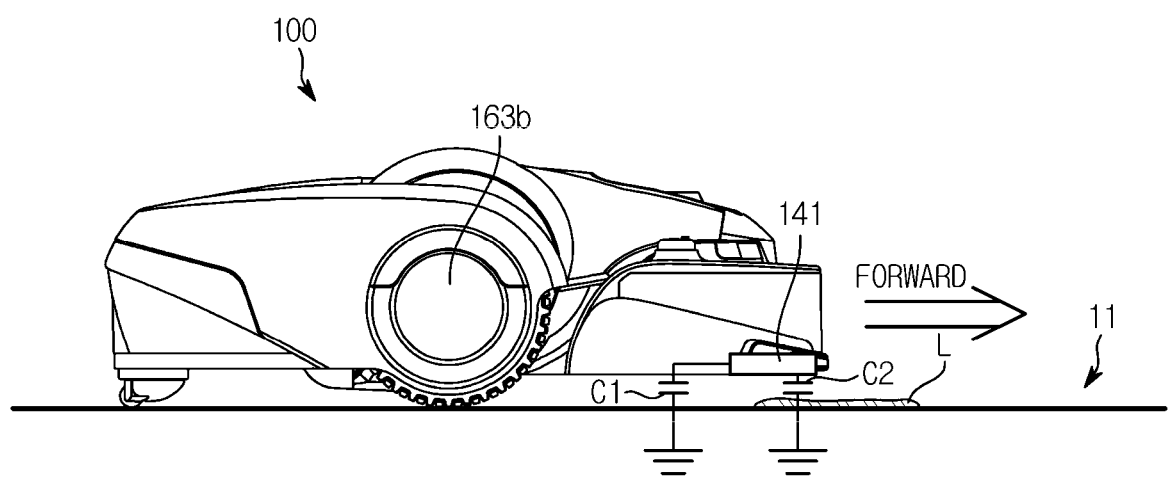

FIGS. 8 and 9 are views for describing a method of detecting liquid by an obstacle detector according to an embodiment of the present disclosure.

Referring to FIG. 8, the cleaning robot 100 may drive a floor 11, which is an example of the cleaning space. According to an example, a liquid L may exist as the obstacle in front of the cleaning robot 100.

Referring to FIG. 9, when the cleaning robot 100 moves forward, the touch IC 143 may detect a capacitance C1 between the floor 11 and the electrode plate 141. By the capacitance C1 according to the dielectric constant between the controller 110 and the electrode plate 141, the controller 110 may determine that there is no obstacle on the floor 11.

As illustrated in FIGS. 8 and 9, when the cleaning robot 100 moves forward, the capacitance may be changed from C1 to C2 by the electrode plate 141 and the liquid L. The touch IC 143 may detect the capacitance C2. The controller 110 may detect the presence or absence of the liquid L on the floor 11 through the difference between C1 and C2.

FIG. 10 is a flowchart illustrating a control method of a cleaning robot for avoiding obstacles according to an embodiment of the present disclosure.

Referring to FIG. 10, the obstacle detector 140 of the cleaning robot 100 may collect the change in the capacitance (400).

In particular, the component for detecting the change in the capacitance in the obstacle detector 140 may be the touch IC 143. The touch IC 143 may detect a minute change in the capacitance that changes between the obstacle and the electrode plate 141 provided at an outer portion of the bottom surface of the sub-body 103.

The touch IC 143 may transmit the collected data to the controller 110. The controller 110 may store a total average value of the collected data in the storage 180 (410).

Here, the total average value may refer to a numerical value of the change in the capacitance detected when there is no obstacle in the cleaning space in which the cleaning robot 100 drives. That is, the total average value is created while the cleaning robot 100 drives about the cleaning space or corresponds to map information stored in advance.

For example, if the cleaning space is a living room and a carpet is provided in a part of the living room, the total average value may be expressed as the change in the capacitance value that can distinguished between the carpet and the floor 11 without the carpet.

The cleaning robot 100 may drive about the cleaning space after securing the above-described total average value (420).

The cleaning robot 100 may perform cleaning in the cleaning space while operating the cleaner 170 while driving.

As the cleaning robot 100 drives, the obstacle detector 140 may detect the obstacle that does not match the total average value, such as the liquid. That is, while driving, the cleaning robot 100 may collect the change in the capacitance collected in the driving direction based on the result detected by the obstacle detector 140.

The controller 110 may obtain an average value of a predetermined portion of the cleaning space where the obstacle is located based on the detected result (430).

The reason for obtaining the partial average value is to prevent unnecessary avoidance operations caused by instantaneous false detection. That is, the partial average value may be a measurement value of detecting the change in the capacitance generated by the obstacle for a predetermined time.

The controller 110 compares the obtained partial average value with a previously stored total average value (440).

When the comparison result is out of a predetermined range, the controller 110 may determine that there is an unexpected obstacle in the driving cleaning space. In addition, the controller 110 may determine the type of the obstacle based on the degree of the compared difference value. A detailed description thereof will be described later with reference to the accompanying drawings.

On the other hand, when it is determined that there is the obstacle, the controller 110 may control the driver 160 to change a moving path to drive, and may determine to avoid the obstacle (450).

The moving path may be changed in various ways, and the controller 110 may control the driver 160 and also control the operation of the cleaner 170 so that the obstacle such as the liquid does not touch the drum brush 173 or the like.

Figure 11A:
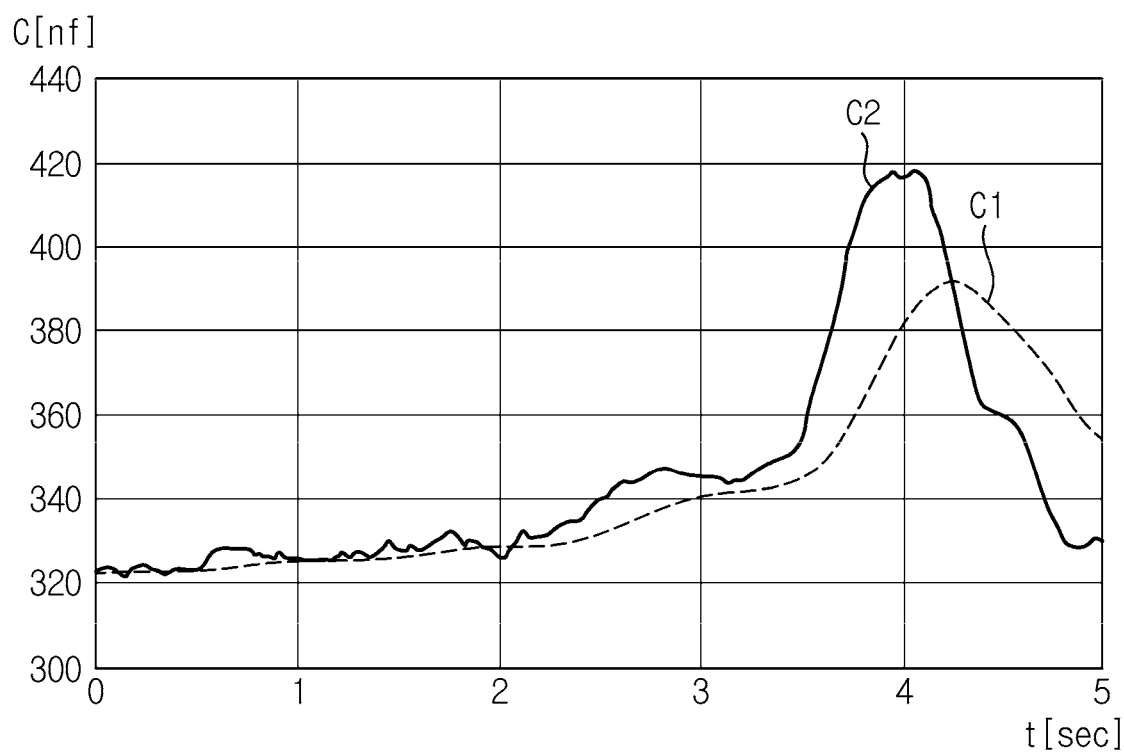
FIGS. 11A and 11B are graphs for describing a method of determining an obstacle according to an embodiment of the present disclosure.
Figure 11B:
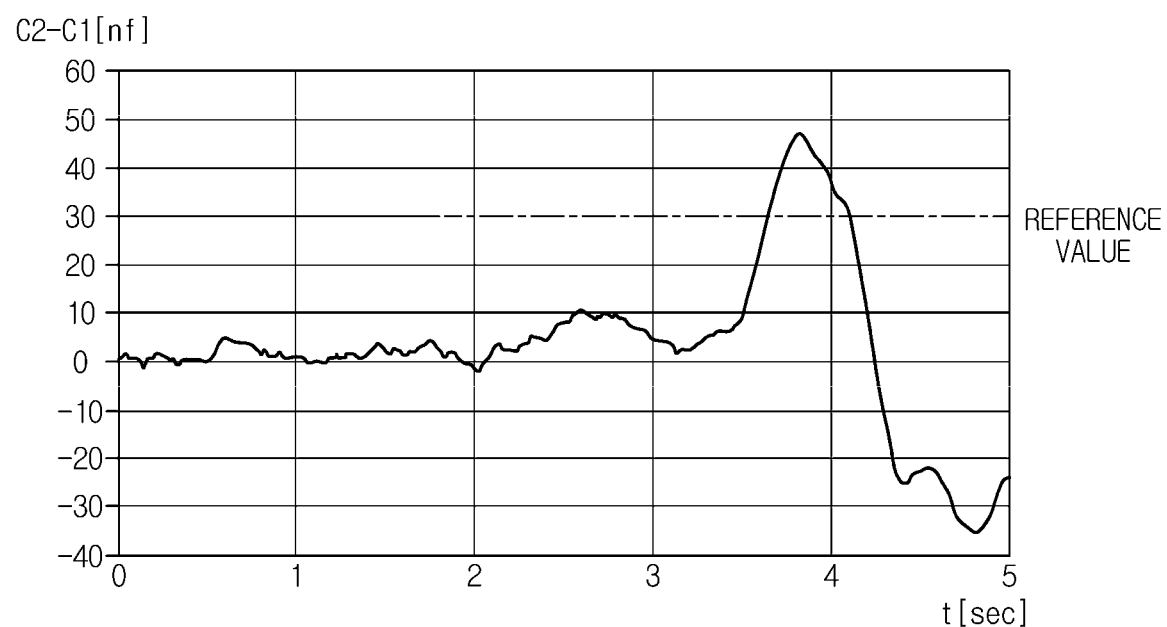

FIGS. 11A and 11B are graphs for describing a method of determining an obstacle according to an embodiment of the present disclosure.

As illustrated in FIGS. 11A and 11B, an X axis represents time (sec) and a Y axis represents capacitance (nF).

In FIG. 11A, C1 denotes the total average value of change in the capacitance previously collected in the cleaning space. When the cleaning robot 100 detects the liquid on the floor 11 while driving, the partial average value C2 of the capacitance detected on the floor 11 of the cleaning space in which the liquid is present may be different from the total average value C1.

The controller 110 may calculate a difference between the collected partial average value C2 and the total average value C1 as illustrated in FIG. 11B. That is, FIG. 11B is a graph illustrating a difference C2-C1 between the partial average value and the total average value.

As illustrated in FIG. 11B, the difference calculated at the time between 3 seconds and 5 seconds may exceed a reference value. In this case, the controller 110 may determine that there is the obstacle such as the liquid in the detected region.

Figure 12:
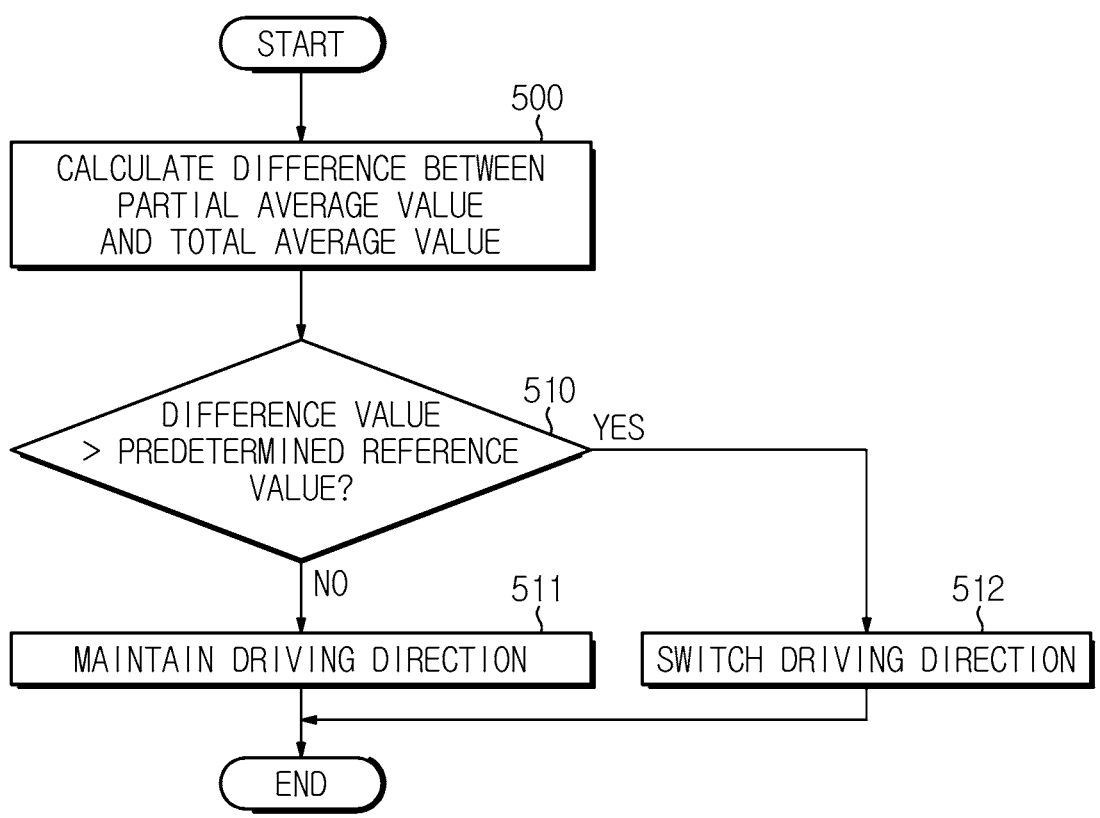
FIG. 12 is a view for describing a determination method for avoiding obstacles such as liquid.

FIG. 12 is a view for describing a determination method for avoiding obstacles such as liquid.

Referring to FIG. 12, the controller 110 may calculate the difference between the partial average value and the total average value (500).

For example, a difference value between the partial average value and the total average value may be positive or negative. According to the disclosed example, the type of the obstacle may be determined according to the magnitude and extent of the difference value. For the obstacles such as liquids, the difference value between the partial average value and the total average value may be positive.

The controller 110 may compare the difference value between the partial average value and the total average value with the predetermined reference value (510).

When the difference value between the partial average value and the total average value does not exceed the predetermined reference value, the controller 110 may determine that the avoidance driving is not enough, and may maintain the driving direction (511).

As illustrated in FIG. 11B, when the difference value between the partial average value and the total average value exceeds the predetermined reference value, the controller 110 may determine that there is the obstacle and switches the driving direction (512).

Figure 13A:
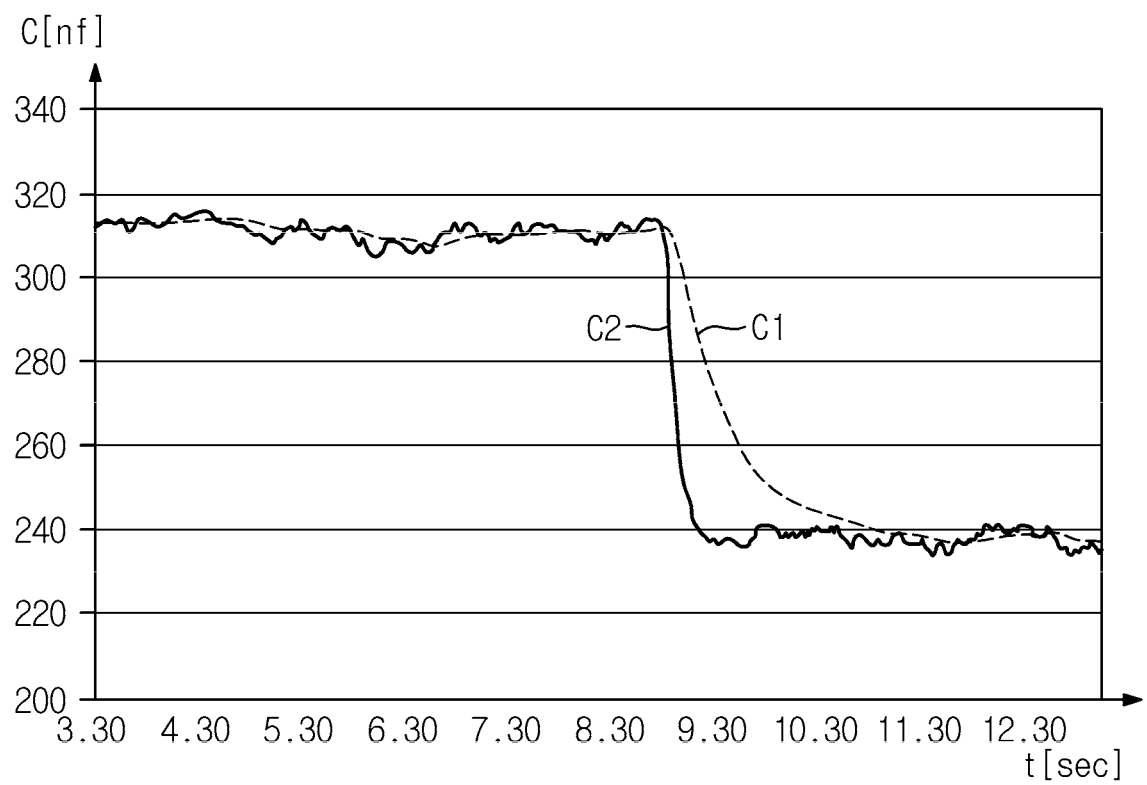
FIGS. 13A and 13B are graphs for describing a method of preventing a fall of a cleaning robot according to another embodiment of the present disclosure.
Figure 13B:
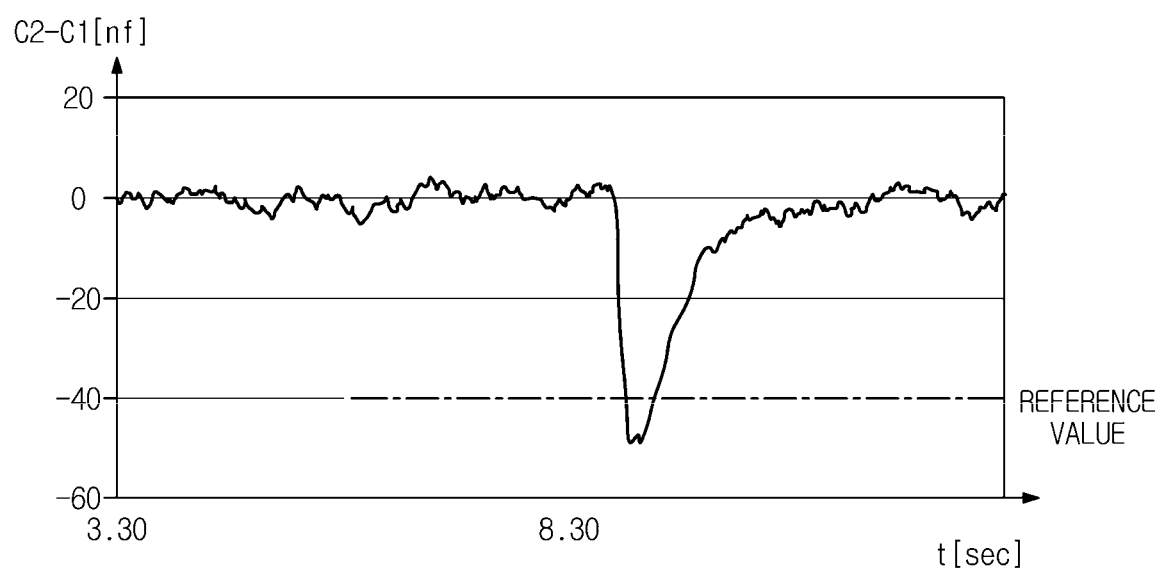

FIGS. 13A and 13B are graphs for describing a method of preventing a fall of a cleaning robot according to another embodiment of the present disclosure.

In FIGS. 11A and 11B, the X axis represents the time (sec) and the Y axis represents the capacitance (nF).

As in another embodiment, the cleaning robot 100 may drive in the cleaning space in which there is a risk of falling, such as stairs, while driving. The partial average value for the section at the risk of falling may be obtained as illustrated in FIG. 13A.

The controller 110 may compare the average value of the capacitances with the partial average value measured in the space at which there is the risk of falling. The comparison result may be obtained as illustrated in FIG. 13B.

Referring to FIG. 13B, the difference value between the partial average value and the total average value may have a negative result. In other words, unlike liquids, there is a difference in the change in the capacitance value generated in the cleaning space where the obstacles and fall risks occur due to the change in the permittivity.

As illustrated in FIG. 13B, when the comparison result has a negative value and the magnitude of the difference exceeds the predetermined reference value, the controller 110 may determine that there is the risk of falling on the driving path.

Figure 14:
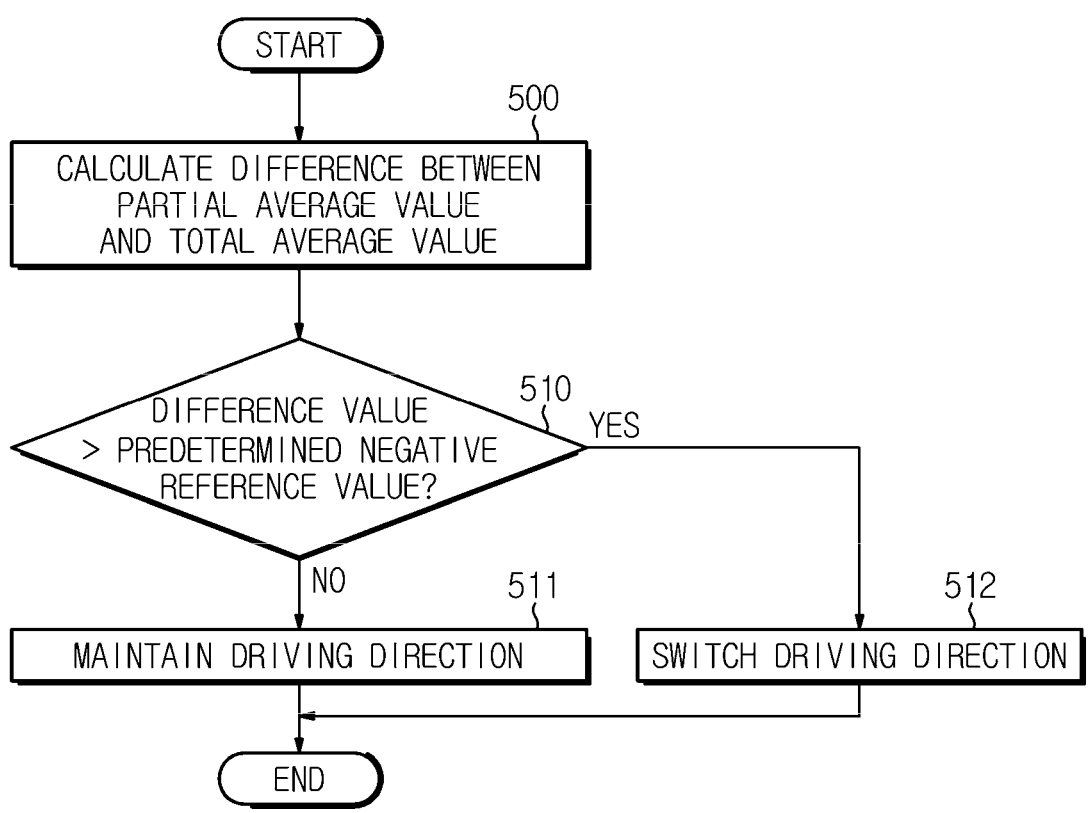
FIG. 14 is a view for describing a determination method for avoiding a risk of falling.

FIG. 14 is a view for describing a determination method for avoiding a risk of falling.

Referring to FIG. 14, the controller 110 may calculate the difference between the partial average value and the total average value (500).

According to another embodiment, the difference between the partial average value and the total average value may be negative. In the case of the obstacle that is the risk of falling, the difference value between the partial average value and the total average value may be calculated as negative unlike that described with reference to FIG. 12.

The controller 110 may compare the difference value between the partial average value and the total average value with the predetermined reference value (520).

When the difference value between the partial average value and the total average value does not exceed a predetermined negative reference value, the controller 110 may determine that the avoidance driving is not enough, and may maintain the driving direction (521).

As illustrated in FIG. 13B, when the difference value between the partial average value and the total average value exceeds the predetermined negative reference value, the controller 110 may determine that there is the obstacle and switches the driving direction (522).

Figure 15:
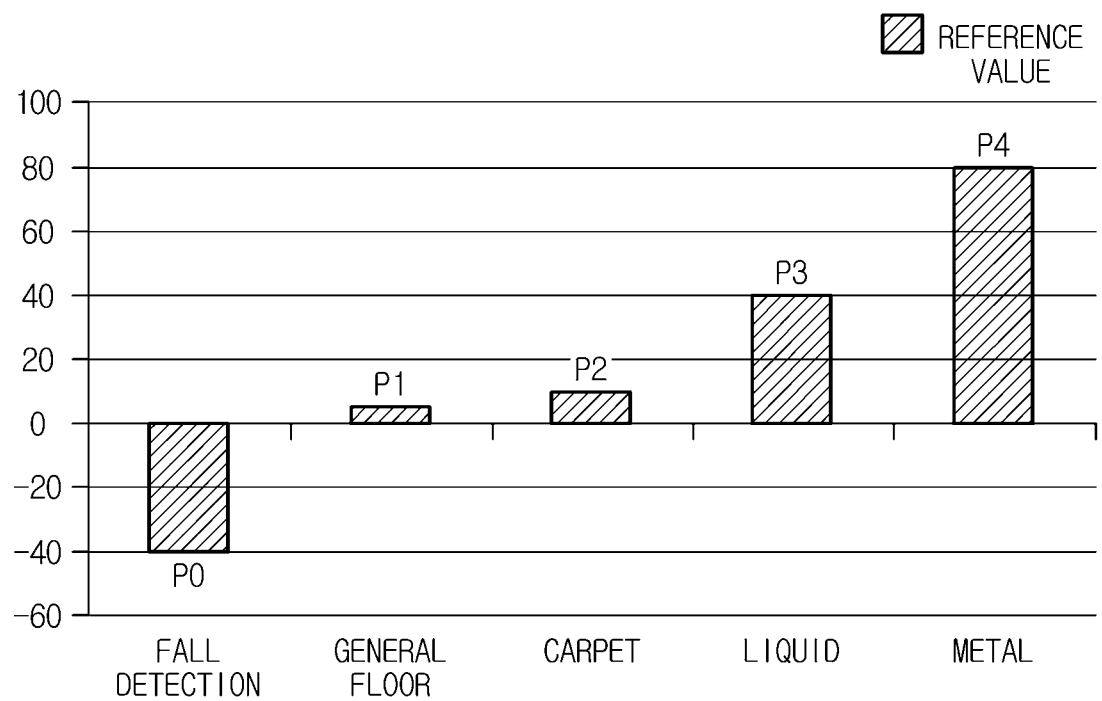
FIG. 15 is a graph for describing a reference for a controller to determine the type of obstacle according to another embodiment of the present disclosure.

FIG. 15 is a graph for describing a reference for a controller to determine the type of obstacle according to another embodiment of the present disclosure.

In FIG. 15, the X axis represents the type of the obstacle, and the Y axis represents the difference value calculated by the controller 110.

The controller 110 may classify the type of the obstacle into a fall detection P0, a general floor P1, a carpet P2, a liquid P3, and a metal P4. When each of the obstacles has a different permittivity depending on its properties, the touch IC 143 may detect the change in the capacitance of the obstacle by pairing with the electrode plate 141.

The touch IC 143 may transmit the difference (hereinafter, referred to as the "difference value") between the partial average value and the total average value calculated according to the electrode plate 141 and the type of the obstacle, and the controller 110 may determine the type of the obstacle currently detected based on FIG. 15 stored in advance in the storage 180 or the like. For example, when the calculated difference value is 40 to 80 or less, the controller 110 may determine that there is the liquid P3 on the driving path. As another example, when the calculated difference value is −50, the controller 110 may determine that there is the risk of falling on the current driving path.

Meanwhile, the reference value illustrated in FIG. 15 is only an example disclosed and may be variously modified according to the sensitivity of the touch IC 143, the size of the electrode plate, and the capacitance.

Figure 16:
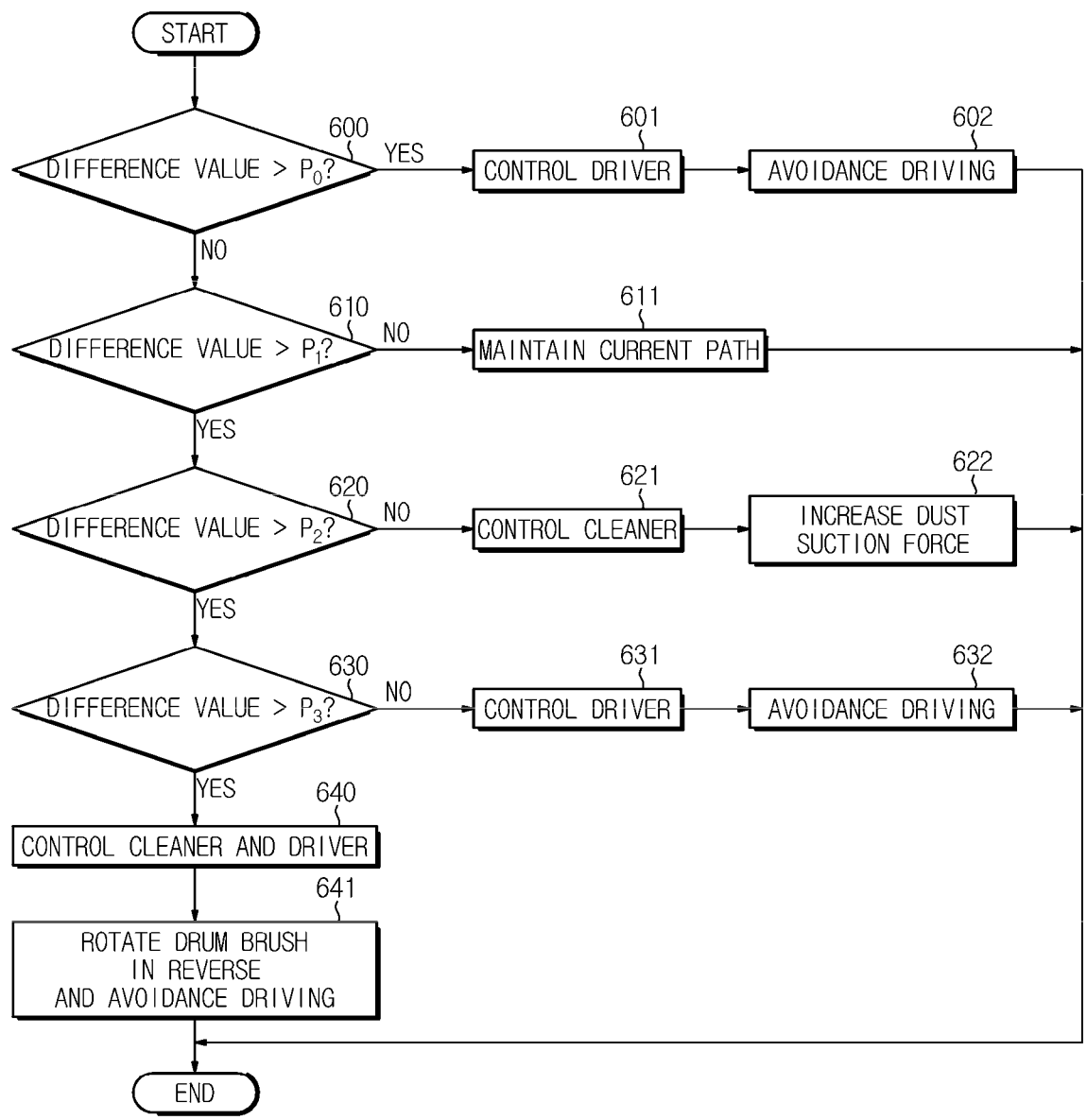
FIG. 16 is a flowchart illustrating a method for a controller to determine the type of obstacle according to another embodiment of the present disclosure.

FIG. 16 is a flowchart illustrating a method for a controller to determine the type of obstacle according to another embodiment of the present disclosure.

Referring to FIG. 16, the controller 110 may calculate the difference value between the partial average value and the total average value. The controller 110 may determine whether the difference value is less than the fall detection P0 of FIG. 15 (600).

When the difference value is less than the fall detection P0 of FIG. 15, the controller 110 may determine that the cleaning robot 100 is in risk of falling on the current path (601). Therefore, the controller 110 may cancel the current driving path and change the path of the risk of falling to perform the avoidance driving (602).

When the difference value exceeds the fall detection P0 of FIG. 15, the controller 110 may determine whether the difference value exceeds the general floor P1 (610).

When the calculated difference value is less than the general floor P1, the controller 110 may determine that the cleaning robot 100 is driving on the floor 11, not to the extent that the driving is changed. That is, the controller 110 may determine that there is no obstacle and maintains the current path (611).

When the difference value exceeds the general floor P1 of FIG. 15, the controller 110 may determine whether the difference value exceeds the carpet P2 (620).

When the calculated difference value exceeds the general floor P1 but does not exceed the carpet P2, the controller 110 may determine that the cleaning robot 100 will drive on the carpet. Therefore, the controller 110 may control the cleaner 170 (621).

For example, when the controller 110 determines that the cleaning robot will drive on the carpet, the controller 110 may control the dust suction motor 175 to increase a dust suction force of the dust suction fan 177 (622).

When the difference value exceeds the carpet P2 of FIG. 15, the controller 110 may determine whether the difference value exceeds the liquid P3 (630).

When the calculated difference value exceeds the carpet P2 but does not exceed the liquid P3, the controller 110 may determine that the cleaning robot 100 will soon drive on the liquid. When the cleaning robot 100 drives on the liquid, since the cleaning robot 100 may affect the cleaning operation afterwards, the controller 110 may control the driver 160 (631).

For example, the controller 110 may perform an operation of avoiding the obstacle by the program stored in the storage 180 in advance, and accordingly, the cleaning robot 100 may perform the avoidance driving (632).

When the calculated difference value exceeds the P3, the controller 110 may determine that the cleaning robot 100 moves a cable made of metal. When the cable is moved, the cable may be sucked into the inlet of the dust box 179 by rotating the drum brush 173. The obstacle can then reduce the efficiency of cleaning or cause failure.

Accordingly, the controller 110 may control the driver 160 and the cleaner 170 (640).

In particular, the controller 110 may control the driver 160 to change the driving path to avoid a metal obstacle such as the cable. In addition, the controller 110 may control the brush driving motor 171 to rotate the drum brush 173 in reverse, thereby preventing the cable from being sucked into the dust box 179 or discharging the sucked cable (641).

Meanwhile, the control method described in FIG. 16 is only an example, and the cleaning robot 100 may perform various control methods based on the detected obstacle.

The invention claimed is:

1. A cleaning robot comprising:
   a main body;
   a driver configured to move the main body;
   an obstacle detector including an electrode plate provided on a bottom of the main body and a touch integrated circuit (IC) configured to detect a change in capacitance detected by the electrode plate;
   a storage configured to store an average value of the capacitance detected by the touch IC; and
   a controller configured to:
      calculate a difference value between a measured value of the capacitance detected by the touch IC and the stored average value of the capacitance while the main body drives, and
      determine an obstacle based on the difference value, and to control the driver.

2. The cleaning robot according to claim 1, wherein the touch IC is provided on a printed circuit board (PCB) substrate including the electrode plate.

3. The cleaning robot according to claim 1,
   wherein the main body further comprises a sub-body provided toward a front of the main body, and
   wherein the obstacle detector is provided in the sub-body toward a driving direction in which the main body drives by the driver.

4. The cleaning robot according to claim 3, wherein the touch IC and the electrode plate are provided toward a side of the driving direction in which the main body drives by the driver in the sub-body.

5. The cleaning robot according to claim 1, wherein the electrode plate is disposed in at least one pad shape and provided on the bottom of the main body at a predetermined interval.

6. The cleaning robot according to claim 1, wherein the electrode plate is provided spaced apart from a predetermined distance between the main body and a bottom surface.

7. The cleaning robot according to claim 1, wherein, when the difference value between the measured value of the capacitance detected by the touch IC and the average value exceeds a predetermined reference value while the main body drives, the controller is configured to control the driver to change a driving direction of the main body.

8. The cleaning robot according to claim 1, wherein the controller is configured to determine a type of the obstacle based on the difference value, and to change an operation of the driver based on the type of the obstacle.

9. The cleaning robot according to claim 1, wherein the controller is further configured to determine a type of the obstacle based on whether the difference value between the measured value and the average value is within a predetermined range.

10. The cleaning robot according to claim 1, wherein the measured value comprises a partial average value of the change in the capacitance collected by the touch IC for a predetermined time.

11. The cleaning robot according to claim 1,
wherein the storage is configured to store a map of a cleaning space based on a space in which the driver moves, and
wherein the controller is further configured to modify the stored map based on the determined obstacle.

12. A method of controlling a cleaning robot including an electrode plate provided on a main body and a touch integrated circuit (IC) configured to detect a change in capacitance detected by the electrode plate, the method comprising:
storing, by a storage, an average value of the change in the capacitance detected by the touch IC in a cleaning space in which the cleaning robot drives;
calculate, by a controller, a difference value between the stored average value with a measured value detected by the touch IC while the main body is driving; and
controlling, by the controller, a driving direction of the main body based on the difference value.

13. The method according to claim 12, wherein the measured value comprises a partial average value of the change in the capacitance collected by the touch IC for a predetermined time.

14. The method according to claim 13, wherein the calculating comprises:
determining whether the difference value between the partial average value and the average value exceeds a predetermined reference value.

* * * * *